United States Patent [19]

Cowan

[11] Patent Number: 5,275,654
[45] Date of Patent: Jan. 4, 1994

[54] CEMENT SEALING

[75] Inventor: Kenneth M. Cowan, Sugarland, Tex.

[73] Assignee: Shell Oil Corporation, Houston, Tex.

[21] Appl. No.: 870,205

[22] Filed: Apr. 13, 1992

Related U.S. Application Data

[60] Continuation of Ser. No. 673,543, Mar. 22, 1991, abandoned, which is a division of Ser. No. 316,119, Feb. 29, 1989, Pat. No. 5,016,711.

[51] Int. Cl.$^5$ .................. C04B 24/08; C04B 24/14; C04B 24/20
[52] U.S. Cl. ................... 106/661; 106/665; 106/725; 106/727; 106/728; 106/802; 106/808; 106/809
[58] Field of Search ............... 106/661, 724, 225, 727, 106/728, 729, 789, 802, 808, 809, 810, 681; 405/266, 267

[56] References Cited

U.S. PATENT DOCUMENTS

| | | | |
|---|---|---|---|
| 2,307,741 | 1/1943 | Goldstein et al. | 106/724 |
| 3,661,603 | 5/1972 | Nicol | 106/727 |
| 3,782,983 | 1/1974 | Kormor | 106/725 |
| 4,083,729 | 4/1978 | Yamada et al. | 106/724 |
| 4,470,727 | 9/1984 | Ritter | 405/267 |
| 4,547,223 | 10/1985 | Goto et al. | 106/724 |
| 4,618,370 | 10/1986 | Green et al. | 106/678 |
| 4,689,083 | 8/1987 | Gutmann et al. | 106/661 |
| 4,992,104 | 2/1991 | Boutevin | 106/724 |
| 5,106,423 | 4/1992 | Clarke | 106/789 |

OTHER PUBLICATIONS

*Concrete Admixtures Handbook;* Ramachandran, ed.; pp. 270-272, 1985.
*The Condensed Chemical Dictionary,* 10ed., 1984, pp. 877-878, 219.

Primary Examiner—Karl Group
Assistant Examiner—C. M. Bonner

[57] ABSTRACT

Cement-to-casing sealing in a wellbore is improved through addition of surfactant to the cement.

24 Claims, No Drawings

CEMENT SEALING

This is a continuation of application Ser. No. 673,543, filed Mar. 22, 1991, now abandoned, which is a divisional of application Ser. No. 316,119, filed Feb. 29, 1989, now allowed as U.S. Pat. No. 5,016,711.

BACKGROUND OF THE INVENTION

1. Field of the Invention

The present invention pertains to improvements in cementing compositions and processes for cementing wells. The improvements provide better bonding and sealing of cement to adjacent surfaces such as casing and geologic formations. The improved seal provides better containment of fluids produced from or injected into geologic formations. The improved seal is also beneficial in containing fluids produced from or injected into the space between two casings where cement is used as a sealant at some point in the annulus between the casings.

2. Description of Prior Art

Subsequent to drilling a borehole of an oil or gas well, casing is run into the well and a cement slurry is placed in the annulus between the outside of the casing and the borehole wall. Typically, the cement slurry is placed in the annulus using a successive fluid displacement technique. In this technique, the cement is first pumped into the casing. Another fluid, often drilling fluid or water, is pumped behind the cement to displace it out the bottom of the casing and up into the annulus between the casing and borehole wall. The cement slurry is usually raised to a point above the uppermost section of the formations to be isolated and may be raised into the annulus between the casing string being cemented and a previously cemented casing.

Once placed, the purpose of the cement slurry is to harden in the annulus and provide an effective seal between the casing and the borehole. The hardened cement sheath prevents or inhibits communication of fluids between the various formations penetrated by the well. In addition to providing zonal isolation, the cement is in contact with the casing and provides mechanical support and resistance to axial movement through the shear bond developed between the interfaces of cement and pipe and cement and formation.

Bonding of the cement to the casing and borehole surfaces is critical to providing an effective seal in the annulus and for providing support for casings. Under most conditions, the bonding of cement to casing is achieved through contact of the cement particles with the surface of the casing. The resulting region of contact provides a mechanical interface which impedes movement of the casing due to high frictional forces. A fluid seal between cement and casing is effected by close contact of the cement particles at the casing surfaces which results in a region of very low effective permeability that prevents fluid migration along the interface.

Bonding between the cement and borehole wall is also achieved through contact of the cement particles with the formation or drilling fluid filter cake commonly deposited at the borehole wall during the drilling of the borehole. Some chemical combinations may also occur between the cement and formation or filter cake which may further enhance bonding and sealing at this interface. However, for this to occur the filter cake or formation should be water wet.

The present invention provides improved contact of the cement particles in an aqueous slurry at the interfaces of casing and formation or filter cake on the borehole wall. The improved contact is retained after the cement hardens resulting in a better fluid tight seal at the interfaces of cement and casing and cement and borehole wall. Better mechanical bonding between the cement sheath and casing and cement sheath and borehole wall is also realized.

The prior art describes various cement dispersants and retarders which are surface active agents; however, such agents are unlike the surface active agents of the present invention and do not provide the surface tension reduction and reduce shrinkage like the agents employed in the present invention. Napthalene sulfonate formaldehyde condensates, phenol sulfonate formaldehyde condensates, and lignosulfonates are commonly added to cement slurries to disperse the cement particles (U.S. Pat. Nos. 4,569,395; 4,687,516; 4,461,856; 3,132,693). These types of surface active agents serve the functions of 1) disaggregating the cement particle clusters and 2) preventing reaggregation of the dispersed cement particles in the slurry. Such surface active agents as these described in the prior art do not reduce the surface tension of the aqueous slurry to a value which improves the interfacial contact of the cement with adjacent surfaces.

Some surfactants of the type used in the present invention have been employed in the prior art for a different purpose than in the present invention, namely in the preparation of liquid fluid loss additives which may be added to the cement slurry (U.S. Pat. No. 4,687,516). In this patent, a dry polymer is slurried into a hydrocarbon carrier fluid. A surfactant is added to oil wet the dry polymer in the preparation. A second surfactant is added to water wet the polymer upon contact with water in the preparation of the cement slurry. While the type and concentration of surfactant in this prior art falls within the range of the present invention, the hydrocarbon carrier introduced prevents realization of improved sealing.

Other surfactants of the type used in the present invention also have been used in cement slurries for a different purpose than in the present invention, namely to prevent migration of gas through the matrix of the "unhardened", setting cement (U.S. Pat. No. 3,926,257). In this patent, cementing is effected by injecting a cement slurry containing a foaming agent which by cooperating with the gas of the formation produces a foam barrier which prevents any subsequent migration of gas through the cement slurry during the setting of the cement slurry.

SUMMARY OF THE INVENTION

Applicant has discovered that the interfacial sealing and bonding between a cement and casing or borehole can be improved by reducing the surface tension of the cement slurry. Reducing the volumetric shrinkage of the cement is also advantageous to developing a fluid-tight interfacial seal and may be accomplished with the same additive which reduces surface tension. Surfactants are added to the cement slurry to reduce the surface tension of the aqueous phase. The reduction in surface tension promotes greater interfacial contact of cement particles with the surfaces of casing and borehole. The surfactants of the invention promote spreading and adhesional contact of the cement particles along the surfaces of the casing and borehole. The result is greater contact area of the cement particle surface with the surfaces of casing and borehole. Greater contact area promotes a fluid-tight seal and better mechanical shear bond between casing, cement and borehole.

Accordingly, the present invention provides a process for cementing a selected part of a well, comprising, determining a surfactant capable of reducing the surface tension of the aqueous phase of an aqueous cement slurry to less than about 50 dynes/square centimeter, ascertaining the amount of the surfactant necessary to accomplish the reduction in surface tension, and injecting the slurry with the necessary amount of the surfactant into the selected area of the well. Alternatively, the present invention provides a process for cementing a casing in a borehole of a well, comprising, injecting an aqueous cement slurry into the well between the casing and the borehole, the slurry containing a sufficient amount of a selected surfactant to reduce the surface tension of the aqueous phase of the slurry to less than about 50 dynes/square centimeter.

In yet another embodiment, the present invention provides a process for cementing a selected part of a well, comprising, determining a surfactant capable of reducing the volumetric shrinkage of an aqueous cement slurry from about 10% to about 75% during setting and hardening, ascertaining the amount of the surfactant necessary to accomplish the reduction in volumetric shrinkage, and injecting the slurry with the necessary amount of surfactant into the selected part of the well. Alternatively, the present invention provides a process for cementing a selected part of a well, comprising, injecting an aqueous cement slurry into the selected part of the well, the slurry containing a sufficient amount of a selected surfactant to reduce the volumetric shrinkage of the slurry up to about 75% during setting and hardening.

In addition, the present invention covers a cement composition for the preparation of an aqueous slurry useful in cementing a selected part of a well, the cement composition resulting in improved interfacial sealing and bonding between the cement and surfaces contacting the cement, comprising cement and a sufficient amount of a selected surfactant capable of reducing the surface tension of the aqueous phase of the slurry to less than about 50 dynes/square centimeter. Alternatively, the present invention covers a cement composition for the preparation of an aqueous slurry useful in cementing a selected part of a well, the cement composition resulting in improved interfacial sealing and bonding between the cement and surfaces contacting the cement, comprising cement and a sufficient amount of a selected surfactant capable of reducing volumetric shrinkage of the slurry from about 10% to about 75% during setting and hardening.

Broadly, the composition of the present invention includes a cement, and water plus surfactant which may be selected from the following non-limiting list of surfactant classes: alkanol amides, ethoxylated alkyl aryl sulfonates or sulfates, amine oxides, betaines and betaine derivatives, ethoxylated alcohols, sulfates or sulfonates of ethoxylated alcohols, ethoxylated alkyl phenols, sulfates or sulfonates of ethoxylated alkyl phenols, water soluble fluorocarbon-based surfactants, phosphate derivatives of ethoxylated alcohols, quaternary ammonium chloride, sulfates or sulfonates of alcohols, and condensation products of ethylene oxide and propylene glycol.

The cement of the present invention is injected into a selected "part" of the well. This "part" may be between casings, between a casing and a borehole, between a casing and a filter cake deposited on a borehole, etc. The cementing may be a "primary" cementing application or the repairing of a previous cementing application, e.g., "remedial" or "squeeze" cementing which can be conducted through perforations in the casing and fractures in the old cement, etc.

Other purposes, distinctions over the art, advantages and features of the invention will be apparent to one skilled in the art upon review of the following.

DETAILED DESCRIPTION OF THE INVENTION

The well cementing compositions of the invention include water, a hydraulic cement, and an additive for enhancing the interfacial sealing and bonding of the cement to casing and borehole. The term "hydraulic cement" is meant to encompass any inorganic cement which hardens or sets under water. Hydraulic cements, for example, include Portland cement, aluminous and pozzolan cement, blast furnace slag cement, and the like. The term is also intended to include cements having extenders such as bentonite, silicates, gilsonite, perlite, pozzolan or glass microspheres, gilsonite, ground coal or silica fume. The term also includes cements used either without any appreciable sand or aggregate material or such cements mixed with granular filling material, such as sand, ground limestone, crushed firebrick and the like. Mixtures of Portland cement and lightweight cement (also referred to as talc cement) are effective within the scope of the invention.

While various hydraulic cements can be utilized in forming the slurries, Portland cements of the various types identified as API Class A through H and J cements are commonly utilized. These cements are identified and defined in "API Specification for Materials and Testing for Well Cements", API SPEC 10, Third Edition, Jul. 1, 1986, of the American Petroleum Institute.

Various additives conventionally added to cement compositions useful in cementing casings in a borehole of a well can also be added to the novel cement compositions herein in the amounts normally used. These additives can include, for example, cement accelerators such as calcium chloride, sodium chloride, gypsum, sodium silicate and seawater; lightweight additives such as bentonite, diatomaceous earth, gilsonite, coal, perlite, and pozzolan; heavy weight additives such as hematite, ilmenite, barite, silica flour, silica sand; cement retarders such as lignins, gluconic acid, sodium borate, boric acid, citric acid, lignosulfonates; filtration control additives such as polyvinyl acetate, vinyl sulfonate/vinyl amide polymers, cellulose derivatives, styrene-butadiene latex; dispersants such as napthalene sulfonate formaldehyde condensates, poly phenol sulfonate condensates or acrylates. In addition, other unconventional additives such as xanthan gum can also be used.

A defoamer may be used with the invention. The defoamer is commonly employed in an amount from about 0.1 to 0.3% by weight of the cement and can be selected from any of the commercially available defoamers commonly used in cement slurries. Defoamers that are satisfactorily used in slurries include Foammaster A and PD-1 by Diamond Shamrock Corp. and Nalco 3801 by Nalco Chemicals, Inc.

Where the cement is placed in an interval where the static temperature exceeds 230° F., it can also be desirable to include from about 20 to 50% silica sand or silica flour by weight of the cement, in the slurries of the invention to prevent strength retrogression. At static temperatures over about 230° F. the strength of the cement will decrease over a period of time unless crystalline silica is added.

The mixing water for the slurry can be fresh water, brackish water, brine, seawater, or other water-containing fluids. Mixing water is utilized with the dry cement composition to produce a fluid pumpable slurry. The amount of water used can vary over a wide range depending upon the consistency of the slurry, the density of the slurry required, the strength requirement for the particular job, and other factors.

The present cement compositions, in addition to hydraulic cement and water in a sufficient amount to produce a pumpable slurry also include an agent or agents or improve interfacial sealing and bonding and reduce shrinkage.

The agents of the invention which improve interfacial sealing and reduce shrinkage are surfactants which reduce the surface tension of the aqueous phase of the cement slurry. The surfactants of the invention may be anionic, amphoteric, cationic, nonionic or blends thereof, e.g., nonionics with anionic or cationic surfactants.

The following surfactants, classes of surfactants, and mixtures of surfactants are particularly useful in the present invention:

1. Alkanol amides (nonionic):

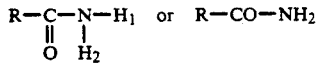

where R = a carbon chain (alkyl group) of 8–20 carbons (usually 10–18); $H_1$ and/or $H_2$ may be replaced by an alkanol such as ethanol or isopropanol. One or both of the H's may be replaced.

Examples: lauric monoisopropanol amide, lauric diethanol amide, coconut diethanol amide. ALKAMIDE 2106® by Alkaril Chemicals, Ltd. is a coconut diethanol amide suitable for this application.

2. Ethoxylated alkyl aryl sulfonate:

Examples: nonyl phenol sulfonate with 8 moles ethylene oxide, and N-decyl benzene sulfonate with 6 moles ethylene oxide.

3. Amine oxides (nonionic):

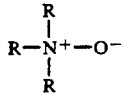

where R = alkyl carbon chains from 1 to 20 carbons, usually one chain is 10 to 18 carbons. Alkyl groups can have hydroxyl or amido functional groups in their chain.

Examples: bis(2-hydroxyethyl) coco amine oxide, bis(2-hydroxyethyl) laurel amine oxide, laurel dimethyl amine oxide, coco amidopropyl dimethyl amine oxide, cetyl dimethyl amine oxide, myristyl dimethyl amine oxide.

4. Betaines and Betaine Derivatives (amphoteric):

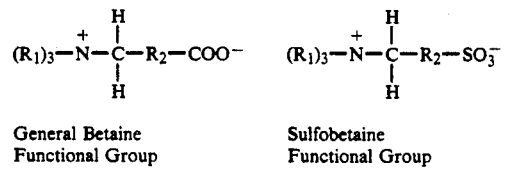

General Betaine Functional Group    Sulfobetaine Functional Group where $R_1$ = alkyl chain length between 3 and 20 carbons, $R_2$ = alkyl chain length between 1 and 4 carbons. Amide functional groups may be incorporated into the $R_1$ alkyl chain.

Examples: coco amido propyl betaine ($R_2$ = propyl group 3 carbons), laurel betaine ($R_1$ = laurel group of 12 carbons, no $R_2$), coco betaine ($R_1$ = coco group of 12-14 carbons, no $R_2$), oleyl betaine ($R_1$ = oleyl group of 18 carbons, no $R_2$), myristic betaine ($R_1$ = myristyl group of 14 carbons, no $R_2$), oleamido propyl betaine, isostearamido propyl betaine, laurel sulfobetaine.

5. Ethoxylated Alcohols (nonionic):

Ethoxylated simple alcohols with linear or branched chains having between 8 and 20 carbons with 3 to 20 moles of ethylene oxide groups; 6–14 moles of ethylene oxide are typical.

Examples: $C_9$–$C_{11}$ linear alcohol with 8 moles ethylene oxide, $C_{14}$–$C_{15}$ linear alcohol with 13 moles ethylene oxide, $C_{12}$–$C_{15}$ linear alcohol with 9 moles ethylene oxide.

6. Sulfates and Sulfonates of Ethoxylated Alcohols (anionic):

The same ranges apply as in No. 5 supra except ethylene oxide moles may vary between 2 and 14.

Examples: $C_{12}$–$C_{13}$ linear alcohol sulfate or sulfonate with 3 moles ethylene oxide, $C_{12}$–$C_{15}$ linear alcohol sulfate or sulfonate with 3 moles ethylene oxide.

7. Ethoxylated Alkyl Phenols (nonionic):

Alkyl chains of 8 to 20 carbons, usually between 4 and 14 carbons and more preferred to be 8 or 9 carbons, with 4–20 moles of ethylene oxide, usually between 7 and 20 moles and more preferred to be 8–12 moles.

Examples: Nonylphenol with 9 moles ethylene oxide, octylphenol with 8 moles ethylene oxide.

8. Sulfates or Sulfonates of Ethoxylated Alkyl Phenols (and their salts) (anionic):

Examples: Nonyl phenol sulfate or sulfonate with 9 moles ethylene oxide; octyl phenol sulfate or sulfonate with 8 moles ethylene oxide.

9. Fluorocarbon-based Surfactants (nonionic, amphoteric, anionic):

These must be water soluble forms. Fluorocarbon esters such as 3M Company's FC-740 are oil soluble and not appropriate for this use. 3M Company's FC-100, FC-129, and FC-170C are commercially available examples of fluorocarbon-based surfactants used in the invention.

Examples: Fluoro-octyl sulfonate or sulfate, perfluorated quaternary ammonium oxide, and fluorinated $C_9$–$C_{11}$ alcohols with 7 moles ethylene oxide.

10. Phosphate Derivatives of Ethoxylated Alcohols:

Examples: $C_{14}$–$C_{16}$ linear alcohol phosphate with 8 moles ethylene oxide; phosphated nonylphenol with 10 moles ethylene oxide.

11. Quaternary Ammonium Chloride (cationic):

Dimethyl dicoco ammonium chloride, cetyl dimethyl benzyl ammonium chloride, cetyl dimethyl ammonium chloride.

12. Sulfates or Sulfonates of Alcohols (and their salts)(anionic):

Sulfated simple alcohols with carbon chains of 8–20, usually between 10 and 16 and most common, 10–12.

Examples: Sodium lauryl sulfate or sulfonate, potassium lauryl sulfate or sulfonate, magnesium lauryl sulfate or sulfonate, sodium n-decyl sulfate or sulfonate, triethanol amine laurel sulfate or sulfonate, sodium 2-ethylhexyl sulfate or sulfonate.

13. Condensation Products of Ethylene Oxide and Propylene Glycol (nonionic):

Examples: Propoxylated $C_9$–$C_{14}$ alcohols with 6 moles ethylene oxide.

The surfactants or mixtures of surfactants should be soluble in the cement slurry and not precipitate or otherwise degrade under the action of the ions in the cement slurry (e.g., resistant to calcium and other electrolytes) and the temperature and pressure conditions occurring during the placement and curing of the cement.

Very good results have been obtained using nonylphenol ethoxylates, coco amido betaine, blends of N-alkyl coco trimethyl ammonium chloride and bis(2-hydroxyethyl) cocoamine oxide, blends of ethoxylated trimethylnonanol and perfluoro quaternary ammonium oxide, $C_{12}$–$C_{15}$ linear alcohol ethoxylate sulfate, $C_9$–$C_{11}$ linear alcohol ethoxylate sulfates, sodium lauryl sulfate, and ethoxy alcohol sulfates.

The concentration of surfactant in the water phase used to prepare the slurry will generally be from about 0.1 to about 5% by weight, and more preferably from about 0.2 to about 3% by weight; excellent results have been obtained with concentrations between about 1.17 and about 2.33% by volume.

The surface tension reduction commonly observed at these concentrations of the surfactant classes previously described is typically less than about 50 dynes/square centimeter and frequently less than about 40 dynes/square centimeter. Usually the surface tension is between about 22 and about 36 dynes/square centimeter. The surface tension provided by commonly used surface active agents described in the prior art is considerably higher than the surface tension of the invention. Table 1 contains a comparison of the surface tension provided by prior art with the present invention.

The improved interfacial sealing and bonding provided by the invention is demonstrated by the data in Tables 2 and 3.

Another primary benefit of the surfactants used is less volumetric shrinkage of the cement slurry during the setting and hardening process. Shrinkage of the cement occurs due to the hydration of the cement particles. The chemical species formed from hydration of the cement occupy less volume than the original cement particles. This chemical shrinkage occurs as the cement is in a highly plastic state and as the cement develops true compressive strength. Shrinkage occurring after the cement has sufficient structural strength to hold a shape can allow the formation of a microchannel at the interface of the casing and cement or casing and borehole. Normal shrinkage for neat cement during setting and hardening is about 5–8% by volume and usually 6–7%. As bulk additives are added (e.g. silica flour) to the cement, less shrinkage occurs per unit volume since there is less cement per unit volume. The present invention can reduce volumetric shrinkage of the slurry by about 10% to about 75%, more usually about 25% to about 65% and most usually about 30% to about 50%. Table 4 contains shrinkage data.

Slurries in accordance with the invention can be formed through the use of conventional techniques and apparatus normally employed in well cementing operations. The surfactant may be added to the bulk cement slurry prepared in a holding tank on the surface according to a procedure commonly referred to as batch mixing. However, the surfactant may be injected continuously into the slurry as it is prepared and pumped into the well by the use of an injection pump. If the surfactant is a solid, it may be solubilized before being injected. Both operations have been successfully performed in field applications without problems.

The invention has been successfully employed in a variety of field applications. The invention has been particularly effective in sealing the annulus between casings in wells drilled with oil muds. Liner overlaps are common examples where cement is raised into the annulus between casings.

TABLE 1

Surface Tension of Solutions Containing Surface Active Agents in Distilled Water at 25° C.

| Additive | Concentration % by weight | Surface Tension dynes/sq.cm. |
|---|---|---|
| PRIOR ART | | |
| Naphthalene Sulfonate Formaldehyde Condensate (Sodium salt) | 0.5 | 73.2 |
| Naphthalene Sulfonate Formaldehyde Condensate (Sodium salt) | 1.0 | 71.7 |
| Phenol Sulfonate Formaldehyde Condensate | 0.5 | 71.7 |
| Phenol Sulfonate Formaldehyde Condensate | 1.0 | 70.2 |
| Blend of Calcium and Sodium Lignosulfonates | 0.1 | 71.0 |
| Blend of Calcium and Sodium Lignosulfonates | 0.25 | 68.3 |
| Blend of Calcium and Sodium Lignosulfonates | 0.5 | 60.9 |
| PRESENT INVENTION | | |
| Coco Amido Betaine | 0.2 | 33.4 |
| Coco Amido Betaine | 1.0 | 33.1 |
| Blend of 75% by volume N-alkyl coco trimethyl ammonium chloride and 25% by volume bis(2-hydroxyethyl) cocoamine oxide | 0.2 | 28.5 |
| Blend of 75% by volume N-alkyl coco trimethyl ammonium chloride and 25% by volume bis(2-hydroxyethyl) cocoamine oxide | 1.0 | 28.8 |
| Blend of 25% by volume of fluoroalkyl sulfonate (sodium salt) and 25% by volume diethylene glycol monobutyl ether and 50% by volume water | 0.004 | 39 |
| Blend of 25% by volume fluoroalkyl sulfonate (sodium salt) 25% by volume diethylene glycol monobutyl ether and 50% by volume water | 0.04 | 17 |
| Blend of 51% by volume potassium fluoroalkyl carboxylates in 4% by volume ethanol, 14% by volume 2-butoxyethanol and 31% by volume water | 0.02 | 23 |
| Blend of 51% by volume potassium fluoroalkyl carboxylates in 4% by volume ethanol, 14% by volume 2-butoxyethanol and 31% by volume water | 0.2 | 17 |
| 95% by volume fluorinated alkyl polyoxyethylene ethanols, 5% by volume water | 0.001 | 22 |
| 95% by volume fluorinated alkyl polyoxyethylene ethanols and 5% by volume water | 0.01 | 20 |
| Sodium lauryl sulfate | 0.2 | 25 |
| 28% by volume active sodium alkyl aryl polyether sulfonate, 72% by volume water | 0.1 | 30 |
| 80% by volume ethoxylated nonylphenol | 0.1 | 32 |

TABLE 1-continued

Surface Tension of Solutions Containing
Surface Active Agents in Distilled Water at 25° C.

| Additive | Concentration % by weight | Surface Tension dynes/ sq.cm. |
|---|---|---|
| (10 moles ethylene oxide), 15% by volume water plus 5% by volume methanol | | |

TABLE 2

Interfacial Sealing Comparison:
Nitrogen Leak Rate at Cement-Pipe Interface
Measured after 24 hrs. @ 100° F.,
Class H Portland Cement Density: 16.4 lb/gal

| Additives and Concentration | Maximum Differential Pressure Held (psi) | Nitrogen Leak Rate* |
|---|---|---|
| Cement slurry, no additives | 300 | $2.77 \times 10^{-3}$ |
| PRESENT INVENTION | | |
| Ethoxylated nonylphenol with 10 moles ethylene oxide 1.17% by wt. of mix water | 800 | No Leak |
| Ethoxylated nonylphenol with 10 moles ethylene oxide 0.23% by wt. of mix water | 1000 | No Leak |
| Blend of 75% by vol. N-alkyl coco trimethyl ammonium chloride and 25% by vol. bis(2-hydroxyethyl) cocoamine oxide, 2.33% by wt. of mix water | 1000 | $2.39 \times 10^{-5}$ |
| Blend of 75% by vol. N-alkyl coco trimethyl ammonium chloride and 25% by vol. bis (2-hydroxyethyl) cocoamine oxide, 1.17% by wt. of mix water | 600 | $9.43 \times 10^{-5}$ |
| Blend of 75% by vol. N-alkyl coco trimethyl ammonium chloride and 25% by vol. bis (2-hydroxyethyl) cocoamine oxide, 0.23 by wt. of mix water | 800 | No Leak |
| Coco amido betaine 2.33% by wt. of mix water | 1000 | No Leak |
| Coco amido betaine 1.17% by wt. of mix water | 1000 | No Leak |

*Nitrogen Leak Rate at interface is in units of cc's/psi-minute.
Leak test time: 30 to 60 minutes at indicated differential pressure.

TABLE 3

Interfacial Sealing Comparison
Nitrogen Leak Rate at Cement/Pipe Interface
Measured after 24 hrs. @ 200° F.,
Class H Portland Cement density: 16.4 lb/gal

| Additives and Concentration | Maximum Differential Pressure Held (psi) | Nitrogen Leak Rate* |
|---|---|---|
| PRIOR ART | | |
| Naphthalene Sulfonate Formaldehyde Condensate 0.25% by wt. of cement plus calcium/sodium Lignosulfonate 0.15% by wt. of cement | 300 | $2.77 \times 10^{-3}$ |
| PRESENT INVENTION | | |
| Calcium/Sodium Lignosulfonate[1] 0.2% by wt. of cement plus 2.33% coco betaine by wt. of mix water | 1500 | No Leak |
| Calcium/Sodium Lignosulfonate[1] 0.2% by wt. of cement plus Blend of 75% by vol. N-alkyl coco trimethyl ammonium chloride and 25% by vol. bis (2-hydroxyethyl) cocoamine oxide | 1500 | No Leak |

TABLE 3-continued

Interfacial Sealing Comparison
Nitrogen Leak Rate at Cement/Pipe Interface
Measured after 24 hrs. @ 200° F.,
Class H Portland Cement density: 16.4 lb/gal

| Additives and Concentration | Maximum Differential Pressure Held (psi) | Nitrogen Leak Rate* |
|---|---|---|
| 2.33% by wt. of mix water Calcium/Sodium Lignosulfonate[1] 0.25% by wt. of cement plus ethoxy alcohol sulfonate | 1000 | $2.21 \times 10^{-5}$ |
| 1.17% by weight of mix water Calcium/Sodium Lignosulfonate[1] 0.30% by wt. of cement plus ethoxylated nonylphenol with 10 moles ethylene oxide | 800 | $2.26 \times 10^{-5}$ |
| 2.33% by wt. of mix water Calcium/Sodium Lignosulfonate[1] 0.30% by wt. of cement plus Ethoxylated nonylphenol with 10 moles ethylene oxide 1.17% by weight of mix water | 1500 | No Leak |

*Nitrogen Leak Rate at interface is in units of cc's/psi-minute.
Leak test time: 30 to 60 minutes at indicated differential pressure.
[1]The calcium/sodium lignosulfonate is present in the composition to retard the cement so that it will remain fluid long enough to be placed in the annulus at elevated temperatures.

TABLE 4

Cement Shrinkage after 24 hrs. @ 100° F.
Shrinkage Measured While Curing Under 2000 psi Pressure
Cement Density: 16.4 lb/gal (API Class H Cement)

| Additives and Concentration | Shrinkage % by volume |
|---|---|
| Cement slurry, no additives | 6.8 |
| PRESENT INVENTION | |
| Ethoxylated nonylphenol with 10 moles ethylene oxide 0.23% by wt. of mix water | 2.6 |
| Blend of 75% by vol. N-alkyl coco trimethyl ammonium chloride and 25% by vol bis(2-hydroxyethyl) cocoamine oxide 1.17% by wt. of mix water | 3.4 |
| Blend of 75% by vol. N-alkyl coco trimethyl ammonium chloride and 25% by vol. bis(2-hydroxyethyl) cocoamine oxide 0.23% by wt. of mix water | 2.6 |
| Coco amido betaine 2.33% by wt. of mix water | 2.5 |
| Coco amido betaine 1.17% by wt. of mix water | 2.6 |

TABLE 5

Cement Shrinkage after 24 hrs. @ 200° F.
Shrinkage Measured While Curing Under 2000 psi Pressure
Cement Density: 16.4 lb/gal (API Class H Cement)

| Additives and Concentration | Shrinkage % by volume |
|---|---|
| PRIOR ART | |
| Naphthalene Sulfonate Formaldehyde condensate[1] 0.25% by wt. of cement plus Calcium/Sodium lignosulfonate 0.15% by wt. of cement | 6.0 |
| PRESENT INVENTION | |
| Calcium/Sodium Lignosulfonate[2] 0.2% by wt. of cement plus 2.33% coco betaine by wt. of mix water | 3.0 |
| Calcium/Sodium Lignosulfonate[2] 0.2% by wt. of cement plus Blend of 75% by vol. N-alkyl coco trimethyl ammonium chloride and 25% by vol. bis(2-hydroxyethyl) cocoamine oxide, 2.33% by wt. of mix water | 2.2 |
| Calcium/Sodium Lignosulfonate[2] | 2.2 |

TABLE 5-continued

Cement Shrinkage after 24 hrs. @ 200° F.
Shrinkage Measured While Curing Under 2000 psi Pressure
Cement Density: 16.4 lb/gal (API Class H Cement)

| Additives and Concentration | Shrinkage % by volume |
|---|---|
| 0.25% by wt. of cement plus ethoxy alcohol sulfonate, 1.17% by wt. of mix water | |
| Calcium/Sodium Lignosulfonate[2] 0.30% by wt. of cement plus ethoxylated nonylphenol with 10 moles ethylene oxide 2.33% by wt. of mix water | 3.1 |
| Calcium/Sodium Lignosulfonate[2] 0.30% by wt. of cement plus ethoxylated nonylphenol with 10 moles ethylene oxide 1.17% by wt. of mix water | 2.7 |

[1] A dispersant to minimize electrostatic attraction of cement particles. Serves to disaggregate cement particle clusters and prevent reaggregation within the slurry.
[2] The calcium/sodium lignosulfonate is present in the composition to retard the cement so that it will remain fluid long enough to be placed in the annulus at elevated temperatures.

The cement formulations of the present invention described in Table 6 are to be prepared in accordance with the components and concentrations of components shown, and further demonstrate the scope and practice of the invention.

TABLE 6

Cement Formulations

| Additives | Concentration % by weight | Surfactant Type |
|---|---|---|
| Class H Cement | 36.96 | Alkanol amide |
| Flyash | 29.1 | |
| Fresh water | 33.28 | |
| Lauric monoisopropyl amide | 0.66 | |
| Class A Cement | 68.49 | Alkanol amide |
| Fresh water | 30.44 | |
| Coconut diethanol amide | 1.21 | |
| Class H Cement | 70.69 | Ethoxylated alkyl aryl sulfonate or sulfate |
| Sea water | 28.37 | |
| Nonylphenol sulfonate or sulfate with 8 moles ethylene oxide | 0.93 | |
| Class H Cement | 69.93 | Ethoxylated alkyl aryl sulfonate or sulfate |
| Fresh water | 28.85 | |
| Carboxymethyl-hydroxy ethyl cellulose | 0.52 | |
| N-decyl benzene sulfonate or sulfate with 6 moles ethylene oxide | 0.69 | |
| Class H Cement | 48.25 | Amine oxide |
| Silica flour | 16.89 | |
| Salt | 9.16 | |
| Hostamere 2825 polymer[1] (vinyl sulfonate/vinyl amide) | .97 | |
| Lignosulfonate retarder | .001 | |
| Fresh water | 24.42 | |
| bis(2-hydroxyethyl) cocoamine oxide | .21 | |
| Class H Cement | 68.35 | Amine oxide |
| Fresh water | 31.05 | |
| Coco amidopropyl dimethyl amine oxide | .06 | |
| Class H Cement | 36.72 | Betaine derivative |
| Flyash | 28.91 | |
| Hydroxyethyl cellulose | 0.66 | |
| Fresh water | 33.06 | |
| Coco betaine | 0.65 | |
| Class C Cement | 65.21 | Betaines and Betaine derivative |
| Fresh water | 33.79 | |
| Coco amidopropyl betaine | 1.0 | |
| Class H Cement | 74.16 | Betaines and Betaine derivative |
| Naphthalene sulfonate Formaldehyde Condensate Dispersant | 0.56 | |
| Polyvinyl alcohol/vinyl acetate Polymer | 0.003 | |
| Fresh water | 24.83 | |
| Lauryl sulfobetaine | 0.16 | |
| Class G Cement | 69.11 | Ethoxylated alcohols |
| Naphthalene sulfonate Formaldehyde condensate Dispersant | 0.35 | |
| Lignosulfonate retarder | 0.14 | |
| Fresh water | 29.52 | |
| C$_9$–C$_{11}$ linear alcohols with 8 moles ethylene oxide | 0.89 | |
| Class H Cement | 33.46 | Ethoxylated alcohols |
| Flyash | 14.18 | |
| Bentonite | 2.86 | |
| Calcium chloride | 0.95 | |
| Fresh water | 48.08 | |
| C$_{14}$–C$_{15}$ linear alcohols with 13 moles ethylene oxide | 0.46 | |
| Class G Cement | 36.13 | Sulfates or sulfonates of ethoxylated alcohols |
| Flyash | 28.44 | |
| Salt | 3.22 | |
| Fresh water | 31.73 | |
| C$_{14}$–C$_{15}$ linear alcohols sulfate or sulfonate with 7 moles ethylene oxide | 0.48 | |
| Class H Cement | 36.01 | Sulfates or sulfonates of ethoxylated alcohols |
| Flyash | 28.35 | |
| Salt | 3.21 | |
| Hydroxyethyl cellulose | 0.32 | |
| Fresh water | 31.4 | |
| C$_{12}$–C$_{13}$ linear alcohol sulfate or sulfonate with 3 moles ethylene oxide | 0.7 | |
| Class H Cement | 54.5 | Ethoxylated alkyl phenols |
| Silica flour | 19.1 | |
| Potassium chloride | 1.2 | |
| Carboxymethyl hydroxy-ethyl cellulose | 0.44 | |
| Phenol sulfonate condensed with formaldehyde dispersant | 0.27 | |
| Lignosulfonate retarder | 0.30 | |
| Defoamer | 0.14 | |
| Fresh water | 23.57 | |
| Nonylphenol with 10 moles ethylene oxide | 0.48 | |
| Class H Cement | 40.58 | Ethoxylated alkyl phenols |
| Sodium silicate | 1.0 | |
| Sea water | 56.25 | |
| Octylphenol with 8 moles ethylene oxide | 2.15 | |
| Class H Cement | 45.5 | Sulfate or sulfonate of ethoxylated alkyl phenols |
| Sand-100 mesh | 15.92 | |
| Hematite | 16.94 | |
| Carboxymethyl hydroxyethyl cellulose | 0.34 | |
| Phenol sulfonate condensed with formaldehyde dispersant | 0.23 | |
| Lignosulfonate retarder | 0.23 | |
| Sodium borate hydrate | 0.23 | |
| Fresh water | 20.24 | |
| Nonyl phenol sulfate or sulfonate with 10 moles ethylene oxide | 0.4 | |
| Class G Cement | 36.41 | Sulfates or sulfonates of ethoxylated alkyl phenols |
| Flyash | 28.66 | |
| Hydroxyethyl cellulose | 0.65 | |
| Sea water | 33.35 | |
| Octyl phenol sulfate or sulfonate with 8 moles ethylene oxide | 0.92 | |
| Class H Cement | 70.55 | Fluorocarbon-based surfactants |
| Hostamere 2825 polymer[1] (vinyl sulfonate/vinyl amide) | 1.06 | |
| Lignosulfonate retarder | 0.18 | |
| Sea water | 27.56 | |
| Perfluorated quaternary ammonium oxide | 0.66 | |
| Class H Cement | 63.26 | Fluorocarbon-based surfactants |
| Silica fume | 6.73 | |
| Hydroxyethyl cellulose | .47 | |
| Lignosulfonate retarder | .00 | |

TABLE 6-continued

Cement Formulations

| Additives | Concentration % by weight | Surfactant Type |
|---|---|---|
| Fresh water | 28.98 | |
| Fluorinated $C_9$–$C_{11}$ alcohols with 7 moles ethylene oxide | 0.56 | |
| Class A Cement | 68.35 | Phosphate derivatives of ethoxylated alcohols |
| Fresh water | 31.25 | |
| $C_{14}$–$C_{16}$ linear alcohol phosphate with 8 moles ethylene oxide | 0.4 | |
| Class H Cement | 49.09 | Phosphate derivatives of ethoxylated alcohols |
| Bentonite | 3.93 | |
| Fresh water | 46.76 | |
| Nonyl phenol phosphate with 10 moles ethylene oxide | 0.22 | |
| Class H Cement | 69.93 | Quaternary ammonium chloride |
| Hydroxyethyl cellulose | 0.42 | |
| Aluminum powder | 0.28 | |
| Fresh water | 29.06 | |
| Dimethyl dicoco ammonium chloride | 0.31 | |
| Class C Cement | 60.51 | Quaternary ammonium chloride |
| Salt | 6.03 | |
| Fresh water | 33.03 | |
| Cetyl dimethyl ammonium chloride | 0.31 | |
| Class G Cement | 52.52 | Sulfates or sulfonates of alcohols |
| Silica flour | 21.01 | |
| Potassium chloride | 1.29 | |
| Fresh water | 24.67 | |
| Sodium lauryl sulfate or sulfonate | 0.51 | |
| Class A Cement | 33.78 | Sulfates or sulfonates of alcohols |
| Flyash | 14.32 | |
| Bentonite | 2.89 | |
| Fresh water | 48.55 | |
| Sodium 2-ethylhexyl sulfate or sulfonate | 0.46 | |
| Class H Cement | 34.84 | Condensation products of ethylene oxide and propylene glycol |
| Flyash | 27.42 | |
| Salt | 5.76 | |
| Fresh water | 31.55 | |
| Propoxylated $C_9$–$C_{14}$ alcohols with 6 moles ethylene oxide | 0.43 | |

[1]Manufactured by Hoechst Celanese Corp.

Cement Composition for Example 1
Cement density: 17.1 lb/gal

| Additive | Concentration | Function |
|---|---|---|
| Silica flour | 35% bwoc[1] | Prevent strength retrogression |
| Polyvinyl alcohol/acetate polymer blend | 1.2% bwoc[1] | Control fluid loss |
| Carboxymethyl hydroxyethyl cellulose | 0.1% bwoc[1] | Retard/Control fluid loss |
| Coco amido betaine | 2.11% by wt. of mix water | Improve bonding and sealing and reduce shrinkage |

[1]bwoc = by weight of cement (cement weighs 94 lbs/sk)

EXAMPLE 1

Liners cemented in a south Louisiana field often required squeeze cementing operations to effect a gas-tight seal which was not provided by the primary cementing operation. After the primary cementing operation, a drawdown was imposed in the wellbore across the liner top to determine if gas from formations would leak through the liner top into the well. Often these negative tests would show a poor seal in the liner at low drawdown pressures. Approximately 50 to 70 percent of the liner tops leaked and had to be squeezed.

A cocoamido betaine surfactant was incorporated into a cement formulation for the primary cementing operation for a liner. The concentration of the surfactant was 2.11% by weight in the aqueous phase. After the primary cementing operation, the cement was allowed to set and harden for an amount of time equal to about that of previous cementing operations. A 4000 psi drawdown was placed across the top of the liner to determine the seal quality. No leakage was measured after several hours at this drawdown pressure.

Cement Formulation for Example 2
Cement density: 17.0 lb/gal

| Additive | Concentration | Function |
|---|---|---|
| Magnesium oxide | 4% bwoc[1] | Expansive agent |
| Polyvinyl alcohol/acetate polymer | 0.4% bwoc[1] | Fluid loss control agent |
| Phenol sulfonate condensed with formaldehyde | 0.5% bwoc[1] | Dispersant |
| Calcium/Sodium lignosulfonate blend | 0.05% bwoc[1] | Retarder |
| Cocoamido betaine surfactant | 1.32% by wt. of mix water | Improve bonding and sealing and reduce shrinkage |

[1]bwoc = by weight of cement (cement weighs 94 lbs/sk)

EXAMPLE 2

A pilot $CO_2$ injection well was to be cemented in an offshore location. A good seal between the cement and borehole and casing had not been achieved in previous wells of this type. The poor seal prevented accurate evaluation of the $CO_2$ injection effectiveness due to loss of injectant to adjacent formations in the borehole.

Zonal isolation was critical to the evaluation but complicated by the close proximity of sands which had similar properties and reservoir pressures as the target sand. However, these adjacent sandstone formations were not to be injected with $CO_2$. The adjacent sands were separated from the target sand by 1 foot thick shale layers.

A cocoamido betaine surfactant (1.32% by weight of the aqueous phase) was used in the cement formulation for the primary cementing operation. The results of acoustic logging evaluations indicated a good seal in the annulus. After perforating the target sand zone, logging programs to monitor fluid flow in the reservoir and adjacent sands indicated the cement had isolated the wellbore at the cement and casing and cement and wellbore interfaces.

Cement Formulation for Example 3
Cement density: 19.1 lb/gal

| Additive | Concentration | Function |
|---|---|---|
| Silica Flour | 35% bwoc[1] | Prevent strength retrogression |
| Hematite | 50 lb. sack | Weighting agent |
| Carboxymethyl hydroxyethyl cellulose | 0.5% bwoc[1] | Control fluid loss and free water |
| Aluminum Powder | 0.6% bwoc[1] | Expansive Agent |
| Lignosulfale retarder | 0.7% bwoc[1] | Retard cement set |
| Ethoxylated alcohol sulfonate | 0.93% by wt. of mix water | Improve bonding and sealing and reduce shrinkage |

[1]bwoc = by weight of cement (cement weighs 94 lbs/sk)

EXAMPLE 3

A scab tieback string of about 1000 feet in length was cemented on top of a leaking liner top in a deep sour gas well. Attempts had been made to squeeze the liner top to seal out the invading gas. The squeeze cementing operations failed to provide a seal and a short tieback string was to be cemented to seal out the gas. The well was drilled with a 19.1 lb/gal oil mud which left casing surfaces oil wet.

A 19.1 lb/gal cement formulation containing an ethoxylated alcohol sulfonate at a concentration of 0.93% by weight was used. After placement, a drawdown was placed across the top of the short tieback string. The drawdown pressure was 4100 psi and was held for 12 hours without any indication of gas invasion.

The foregoing description of the invention is merely intended to be explanatory thereof, and various changes in the details of the described processes and compositions may be made within the scope of the appended claims without departing from the spirit of the invention.

What is claimed is:

1. A cement composition for the preparation of an aqueous slurry useful in cementing a selected part of a well, the cement composition resulting in improved interfacial sealing and bonding between the cement and surfaces contacting the cement, comprising cement and a sufficient amount of a blend of N-alkyl coco trimethyl ammonium chloride and bis(2-hydroxyethyl) cocoamine oxide capable of reducing the surface tension of the aqueous phase of the slurry to less than about 50 dynes/square centimeter.

2. The composition of claim 1 wherein the blend of N-alkyl coco trimethyl ammonium chloride and bis(2-hydroxylethyl)cocoamine oxide is present in an amount capable of reducing the surface tension of the aqueous phase to less than about 40 dynes/square centimeter.

3. The composition of claim 1 wherein the blend of N-alkyl coco trimethyl ammonium chloride and bis(2-hydroxylethyl)cocoamine oxide is present in an amount capable of reducing the surface tension of the aqueous phase to between about 22 and about 36 dynes/square centimeter.

4. The composition of claim 1 wherein the concentration of the blend of N-alkyl coco trimethyl ammonium chloride and bis(2-hydroxylethyl)cocoamine oxide in the aqueous phase of the slurry ranges from about 0.1 to about 5% by weight.

5. The composition of claim 1 wherein the concentration of the blend of N-alkyl coco trimethyl ammonium chloride and bis(2-hydroxylethyl)cocoamine oxide in the aqueous phase of the slurry ranges from about 0.2 to about 3% by weight.

6. The composition of claim 1 wherein the concentration of the blend of N-alkyl coco trimethyl ammonium chloride and bis(2-hydroxylethyl)cocoamine oxide in the aqueous phase of the slurry ranges from about 1.17 to about 2.33% by weight.

7. The composition of claim 1 wherein the cement is Portland cement.

8. The composition of claim 1 wherein the cement is blast furnace slag.

9. A cement composition for the preparation of an aqueous slurry useful in cementing a selected part of a well, the cement composition resulting in improved interfacial sealing and bonding between the cement and surfaces contacting the cement, comprising cement and a sufficient amount of a blend of ethoxylated trimethylnonanol and perfluoro quaternary ammonium oxide capable of reducing the surface tension of the aqueous phase of the slurry to less than about 50 dynes/square centimeter.

10. The composition of claim 9 wherein the blend of ethoxylated trimethylnonanol and perfluoro quaternary ammonium oxide is present in an amount capable of reducing the surface tension of the aqueous phase to less than about 40 dynes/square centimeter.

11. The composition of claim 9 wherein the blend of ethoxylated trimethylnonanol and perfluoro quaternary ammonium oxide is present in an amount capable of reducing the surface tension of the aqueous phase to between about 22 and about 36 dynes/square centimeter.

12. The composition of claim 9 wherein the concentration of the blend of ethoxylated trimethylnonanol and perfluoro quaternary ammonium oxide in the aqueous phase of the slurry ranges from about 0.1 to about 5% by weight.

13. The composition of claim 9 wherein the concentration of the blend of ethoxylated trimethylnonanol and perfluoro quaternary ammonium oxide in the aqueous phase of the slurry ranges from about 0.2 to about 3% by weight.

14. The composition of claim 9 wherein the concentration of the blend of ethoxylated trimethylnonanol and perfluoro quaternary ammonium oxide in the aqueous phase of the slurry ranges from about 1.17 to about 2.33% by weight.

15. The composition of claim 9 wherein the cement is Portland cement.

16. The composition of claim 9 wherein the cement is blast furnace slag.

17. A cement composition for the preparation of an aqueous slurry useful in cementing a selected part of a well, the cement composition resulting in improved interfacial sealing and bonding between the cement and surfaces contacting the cement, comprising cement and a sufficient amount of a $C_{12}$–$C_{15}$ linear alcohol ethoxylate sulfate capable of reducing the surface tension of the aqueous phase of the slurry to less than about 50 dynes/square centimeter.

18. The composition of claim 17 wherein the $C_{12}$–$C_{15}$ linear alcohol ethoxylate sulfate is present in an amount capable of reducing the surface tension of the aqueous phase to less than about 40 dynes/square centimeter.

19. The composition of claim 17 wherein the $C_{12}$–$C_{15}$ linear alcohol ethoxylate sulfate is present in an amount capable of reducing the surface tension of the aqueous phase to between about 22 and about 36 dynes/square centimeter.

20. The composition of claim 17 wherein the concentration of the $C_{12}$–$C_{15}$ linear alcohol ethoxylate sulfate in the aqueous phase of the slurry ranges from about 0.1 to about 5% by weight.

21. The composition of claim 17 wherein the concentration of the $C_{12}$–$C_{15}$ linear alcohol ethoxylate sulfate in the aqueous phase of the slurry ranges from about 0.2 to about 3% by weight.

22. The composition of claim 17 wherein the concentration of the $C_{12}$–$C_{15}$ linear alcohol ethoxylate sulfate in the aqueous phase of the slurry ranges from about 1.17 to about 2.33% by weight.

23. The composition of claim 17 wherein the cement is Portland cement.

24. The composition of claim 17 wherein the cement is blast furnace slag.

* * * * *